Patented June 7, 1932

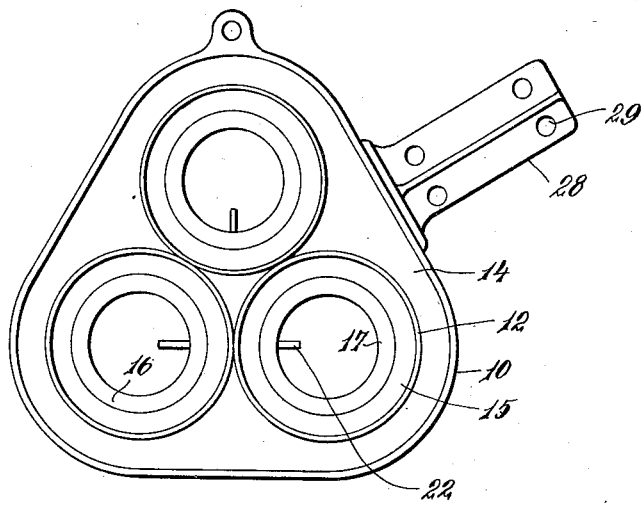
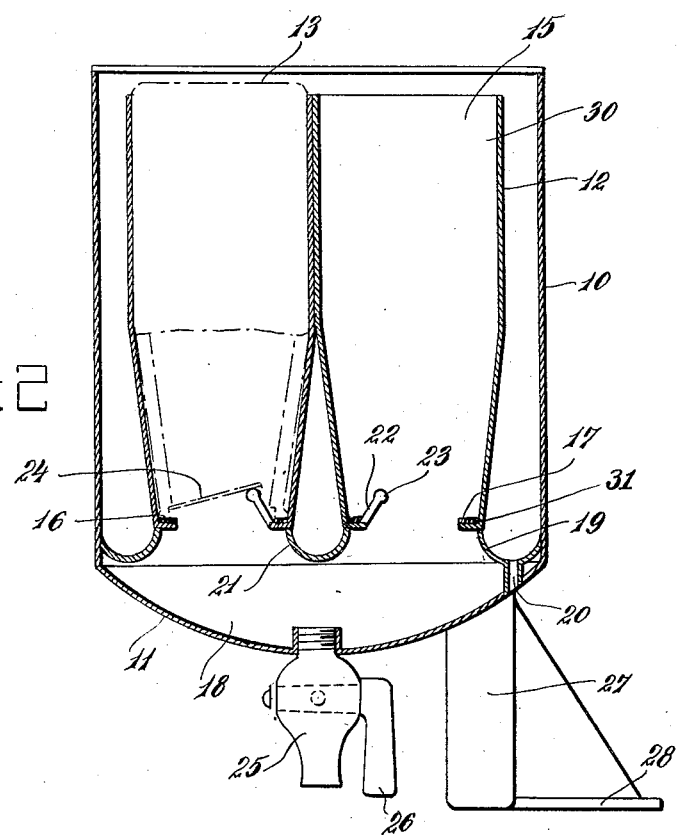

1,861,619

UNITED STATES PATENT OFFICE

WILLIAM BELLMER, OF BROOKLYN, NEW YORK

MILK DISPENSER

Application filed December 10, 1930. Serial No. 501,201.

The main object of this invention is to provide a dispenser into which filled milk bottles are introduced, the contents of these bottles being dispensed as desired through a valve located at the lower end of the device.

Another object of the invention is to provide a dispenser into which a plurality of down turned milk bottles may be introduced, the caps of the milk bottles being collapsed by a deflector arm which engages the cap of each milk bottle cap and depresses the same into the downturned bottle so that the milk contained therein may be exhausted from the bottle when desired.

Still another object of the invention is to provide a dispenser adapted to receive a plurality of milk bottles and retain the contents thereof cold, in a sanitary and hygienic manner.

The above and other objects will become apparent in the description below in which characters of reference refer to like named parts in the drawing.

Referring briefly to the drawing, Figure 1 is a top plan view of the dispenser with the cover removed therefrom.

Figure 2 is a longitudinal, sectional elevational view through the dispenser.

Referring in detail to the drawing, the numeral 10 indicates a substantially triangular body which is provided with a concave bottom 11. Contained within the body 10 is a plurality of cylinders 12 which are arranged in triangular formation and are adapted to receive therein, in inverted position milk bottles 13 of the conventional outline. The upper end of the body 10 is open, and access to the space 14 between the cylinders and the body 10 is had through this open end. The space or chamber 14 bounding the cylinders within the body, is adapted to receive cracked ice or cooling coils not shown on the drawing.

The milk bottles are deposited in the cylinders by introducing the same through the upper open end 15 of said cylinders. The lower beaded rims 16 of the milk bottles are lowered until they sit upon an integral flange 17 formed in the cylinders 12. The chamber 14 is separated and completely isolated from the milk pocket 18 by a curvedly formed water trough 19 which is provided with a drip vend or outlet 20 at one or more positions. A further means of dividing or isolating the chamber 14 from the pocket 18 is provided in a curved floor 21, joining the lower edges of the adjacent walls of the cylinders 12. Deflector arms 22 are formed integral with the flanges 17 and extend upwardly in an inclined course toward the centers of the cylinders 12. These deflector arms have rounded heads 23 to prevent fracture or injury to the conventional paper or fibre bottle caps 24 with which said arms come in contact when the milk bottles are lowered into the cylinders. A valve 25 with an operating lever 26 is secured to the concave bottom 11 and when opened is adapted to drain the milk content from the pocket 18 to any convenient or desirable container which is to be filled.

Means is provided for mounting the entire device upon the edge of a counter or other dispensing location. This means comprises a right angled bracket, one of whose extensions 27 is secured directly to the body 10, while the other extension 28 is provided with counter sunk holes 29 through which screws are inserted to secure the entire device rigidly and in stationary position on a dispensing counter or the like at any desirable position.

The device is adapted to dispense milk or other fluids which must be hygienically kept and dispensed in a sanitary manner. The temperature in the container is lowered by introducing a pack of chopped ice into the chamber 14. This chamber envelops the entire areas of the cylinders 12 and cools the fluid contained in the bottles 13, which are inserted into the bottle compartments 30, as indicated by the broken lines in Figure 2. As the bottle is lowered into its respective cylinder the cap remains seated in place in the bottle. The deflector arms 22 come into contact with this cap and deflect and bend said cap upwardly so that an opening appears around the cap through which the fluid drains into the pocket 18. This fluid may then be conveniently dispensed by manipulation of the operating handle 26 of the valve 25. When packed ice is utilized in lowering the temperature of the fluid contained in the device, drip vent 20 may be provided, but when refrigeration coils are used this construction is not required. To assure a leak proof fit when the bottle rests upon the flange, a rubber gasket ring 31 may be seated upon the flange with the bottles resting thereon.

It is to be noted that certain changes in form and construction may be made without departing from the spirit and scope of the invention.

I claim:

1. A device of the class described comprising a walled chamber of the same substantial conformation as an inverted milk bottle, said chamber having a mouth at the bottom and being adapted to receive an inverted milk bottle therein, an internal flange around said mouth providing an annular shoulder upon which the mouth of the milk bottle is adapted to seat, a rigid deflector arm secured to said flange and extending angularly upward into said chamber from said flange, said arm being adapted to dislodge the paper cap of the milk bottle upon contact of said arm with said cap as the mouth of the inserted milk bottle nears said flange, said arm having an enlarged end thereon adapted to push one side of said cap toward the inside of the bottle without damaging said cap.

2. A device of the class described comprising a walled chamber of the same substantial conformation as an inverted milk bottle, said chamber having a mouth at the bottom and being adapted to receive an inverted milk bottle therein, an internal flange around said mouth providing an annular shoulder upon which the mouth of the bottle is adapted to seat, a rigid deflector arm secured to said flange and extending angularly upward into said chamber from said flange, said arm having a ball rigid with its free end and being adapted to dislodge the paper cap of the milk bottle upon contact of said arm with said cap as the mouth of the inserted bottle nears said flange, said ball being adapted to push one side of said cap toward the inside of the bottle without damaging said cap.

In testimony whereof I affix my signature.

WILLIAM BELLMER.